United States Patent [19]

Carlqvist et al.

[11] 4,082,924
[45] Apr. 4, 1978

[54] REFERENCE SIGNAL CIRCUIT IN A RECEIVER FOR DETECTING TWO FREQUENCIES IN A MULTIFREQUENCY TONE SIGNAL

[75] Inventors: Bengt Roland Carlqvist, Stockholm; Anders Gunnar Eriksson, Johanneshov, both of Sweden

[73] Assignee: Telefonaktiebolaget L M Ericsson, Stockholm, Sweden

[21] Appl. No.: 755,826

[22] Filed: Dec. 30, 1976

[30] Foreign Application Priority Data

Feb. 9, 1976 Sweden .............................. 7601387

[51] Int. Cl.² .............................................. H04M 1/50
[52] U.S. Cl. ................................................ 179/84 VF
[58] Field of Search ............... 179/84 R, 84 VF, 2 A; 328/138, 139, 140

[56] References Cited

U.S. PATENT DOCUMENTS 3,875,347  4/1975  Alaily .............................. 179/84 VF
3,934,096  1/1976  Kusano ........................... 179/84 VF

*Primary Examiner*—Kathleen H. Claffy
*Assistant Examiner*—Joseph A. Popek
*Attorney, Agent, or Firm*—Hane, Roberts, Spiecens & Cohen

[57] ABSTRACT

A reference signal circuit in a multi-frequency signal receiver for detecting the two signalling frequencies in an incoming voice frequency signal. The circuit has two paths for receiving the incoming signal. One path includes a rectifier and attenuation device to give a first signal level dependent on the incoming signal level. The other path includes a first comparator to compare the instantaneous level of the incoming signal with such first signal level, a timing circuit and a second comparator in order to obtain a second signal level whose amplitude is dependent on the duration of the incoming signal. The outputs of the two signal paths are interconnected via a gating circuit to feed a reference voltage to analog signal comparators included in the multi-frequency signal receiver.

4 Claims, 5 Drawing Figures

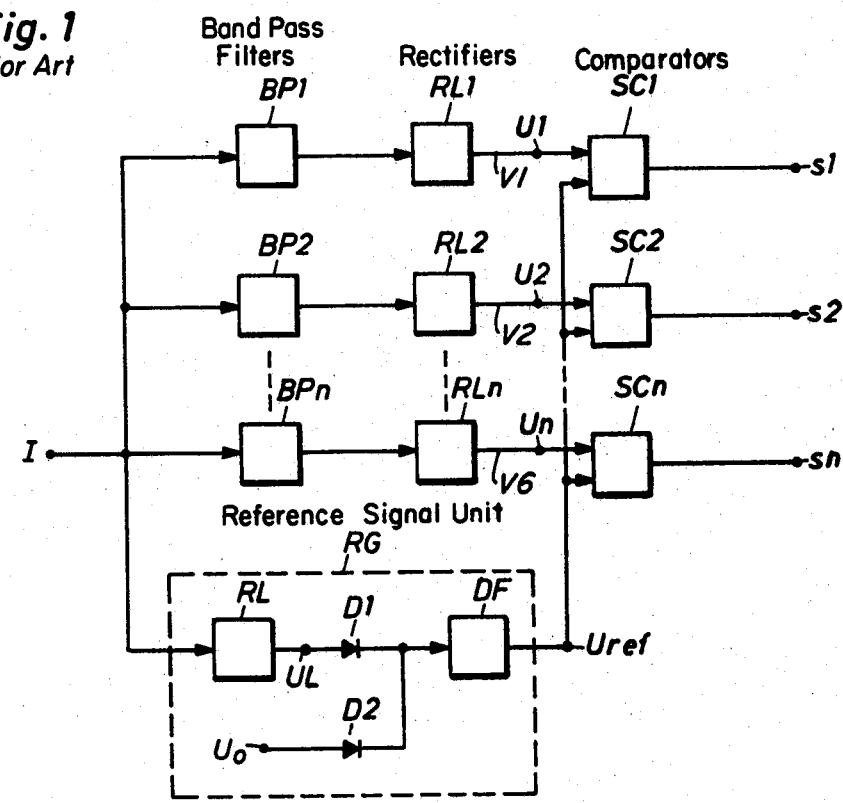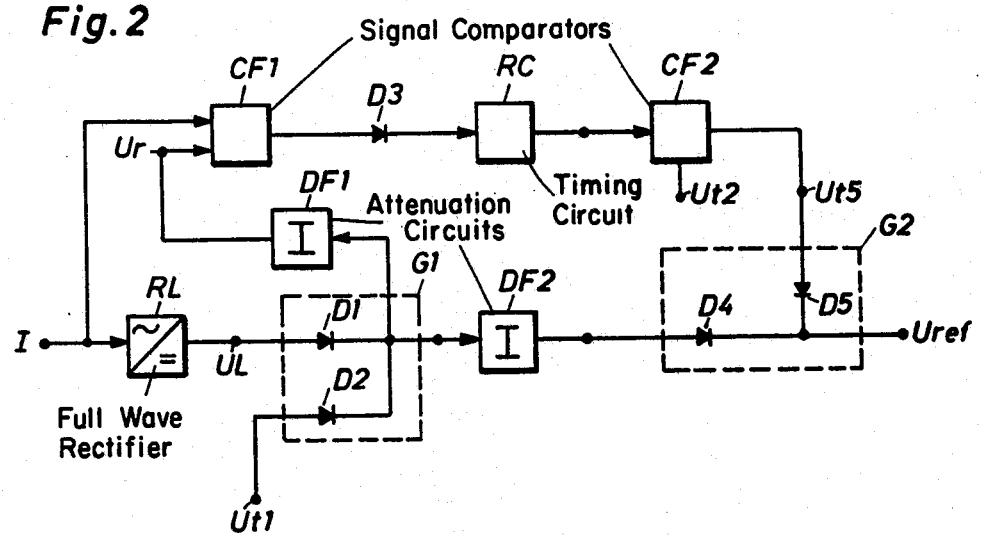

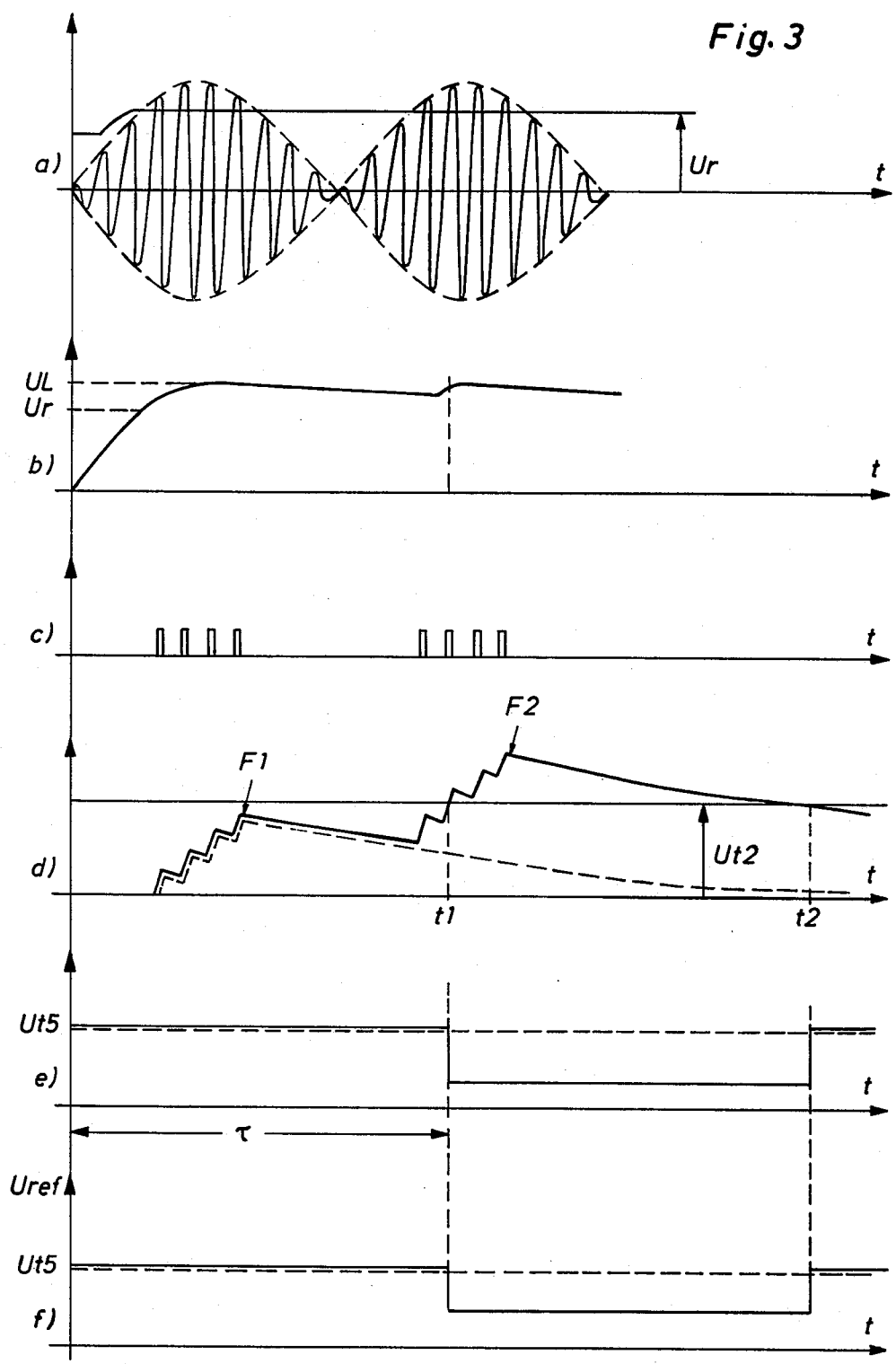

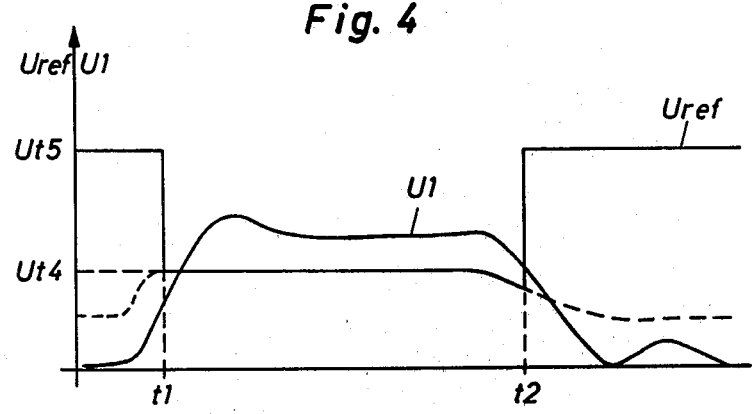
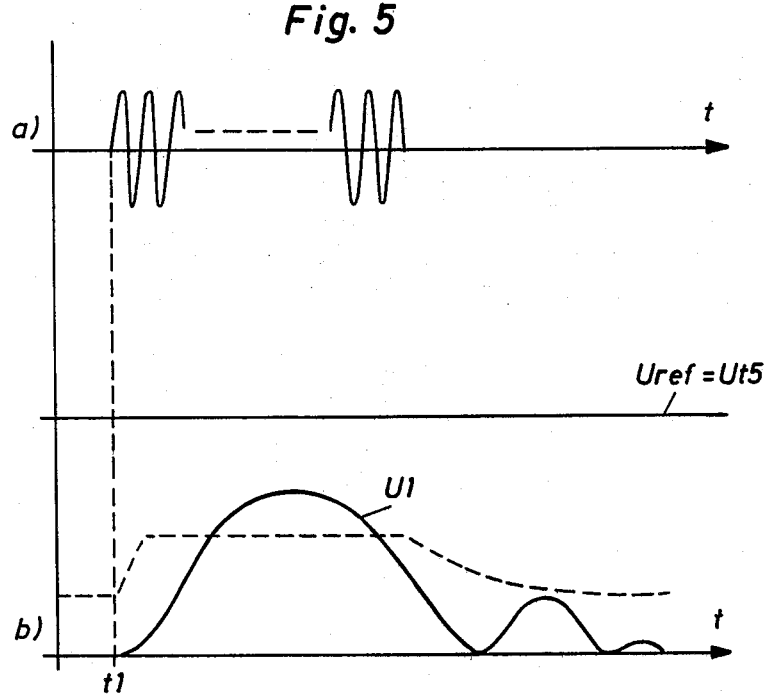

REFERENCE SIGNAL CIRCUIT IN A RECEIVER FOR DETECTING TWO FREQUENCIES IN A MULTIFREQUENCY TONE SIGNAL

The present invention relates to a reference signal circuit in a MFC-signalling receiver for the detection of an incoming tone signal having two voice frequencies of determined value. More specifically, the invention relates to a such a circuit for the incoming signal to the receiver, whereby the voice frequencies included in the tone signal can be correctly detected during a transient disturbing signal of short duration.

When signalling, for example, between two telephone exchanges, it is common to use so called MFC-signalling which implies transmission of signal information from one exchange to another as a combination of two different frequencies. The frequencies included in the tone signal then are selected from six different frequency values according to a certain code. The transmitted tone signal which represents the signal information, thus includes two tones with differing frequency components and the frequency combination being selected represents the signalling information which is desired to be transferred, for example, signal information about clearing, dialling etc. from the transmitting exchange. The two tones can, when arriving to the receiver, have a level between −33 and −55 dBm, the maximum permitted level difference (twist) between the tones being 7dBm. Obviously it is important that the receiving exchange reliably detects what frequency combination has been transmitted from the transmitting exchange in order to correctly determine the signal information transferred. A disturbing signal appearing at the receiving exchange containing some of the frequency values intended for signalling can be erroneously detected in the signal receiver of the receiving exchange and thus give false signal information. The purpose of using two different frequencies in a certain code according to the principle of MFC-signalling is to avoid the above mentioned risks of erroneous detection of transient signals. However, this condition does not always give a reliable detection when a transient signal of certain duration appears in the telecommunication equipment.

An object of the present invention is thus to provide a reference signal circuit included in an MFC-signalling receiver for the correct detection of incoming signalling information so that the receiver is practically insensitive to an incoming disturbing signal of certain duration.

The invention, the characteristics of which appear from the appended claims, will now be more fully described with reference to the accompanying drawings wherein:

FIG. 1 shows a block diagram of an MFC-signalling receiver of known kind;

FIG. 2 shows a block diagram of a reference signal circuit according to the present invention;

FIG. 3 shows a timing diagram illustrating certain signals which appear in the circuit according to FIG. 2;

FIG. 4 shows a timing diagram illustrating a reference signal from the circuit according to FIG. 2 with a signal filtered out in the receiver;

FIG. 5 shows a similar diagram illustrating a transient signal of certain duration entering the receiver.

In order to fully illustrate the principle of the invention, a known MFC-signalling receiver according to FIG. 1 will first be described. The known receiver comprises a number of signalling paths connected in parallel, where each of the signalling paths consists of a bandpass filter BP1–BP6, a rectifier RL1–RL6 and a signal comparator SC1–SC6. The outputs $s1$–$s6$ of each signal comparator SC1–SC6 form the outputs of the receiver and are connected to a subsequent indication device, for example, the winding of a relay. A reference signal unit RG is connected in parallel with the signal paths to deliver a reference signal $U_{ref}$ to the signal comparators SC1–SC6 in dependence on the incoming signal level. Each signal comparator has two inputs and an output, the comparator $SCn$ comparing the input signals and giving an output signal if the signal from the input which is connected to the output of the rectifier $RLn$ exceeds the reference signal $U_{ref}$ across the second input. Across the input I of the receiver, a tone signal normally appears which contains the two frequency components being selected to transfer signalling information and which should be detected in the receiver. The number of signalling paths is equal to the number of frequencies $f1$–$f6$ from which the two frequency components including in the tone signal have been selected. Each bandpass filter BP1–BP6 is tuned to each of the frequencies $f1$–$f6$.

If it is assumed that the incoming tone signal contains the frequencies $f1$ and $f2$, an unattenuated signal appears across the output U1 of the rectifier RL1 and across the output U2 of the rectifier RL2. At the same time, the incoming signal to the receiver containing the frequencies $f1$ and $f2$ appears across the input of the reference signal unit RG. This unit contains a rectifier RL in series with a diode D1 and an attenuation circuit DF. Between the diode D1 and the attenuation circuit DF a threshold voltage $U_o$ is connected via the diode D2. When the incoming signal level is so low that the rectified value $UL0$ is below the threshold voltage $U_o$, the diode D2 is conducting and the diode D1 blocked, the reference voltage $U_{ref}$ being proportional to the threshold voltage $U_o$. When the level of the incoming signal is so high that its rectified value $UL0$ is greater than the threshold voltage $U_o$, instead the diode D1 is conducting and the diode D2 blocked and the reference voltage $U_{ref}$ is proportional to the incoming tone signal level. If a tone signal which contains, for example, the frequencies $f1$ and $f2$ answers to the receiver, the reference voltage is proportional to the rectified value of the incoming signal in the rectifier RL. The rectified output voltages U1 and U2 are both greater than this reference voltage and an output signal from the signal comparators SC1, SC2 is obtained which forms an indication that two correct tone signals have been received. If a tone signal with the wrong frequency or with too low a level is received, none of the output voltages U1–U6 is greater than the reference voltage $U_{ref}$ and thus no output signal from the signal comparators SC1–SC6 is obtained.

In operation the tone signal receiver is subject to violent disturbances which can give rise to a false indication. In order to reduce the sensitivity of disturbance by a transient signal with short duration, the reference signal unit RG can, according to the invention, be designed as a reference signal circuit as illustrated in FIG. 2.

The circuit according to FIG. 2 replaces the reference signal unit RG according to FIG. 1. The circuit according to FIG. 2 mainly consists of two parallel signal paths. One signal path contains a reference rectifier RL for full wave rectifying of the incoming tone signal to the receiver. To the output of the rectifier RL one input of a gate circuit G1 is connected which consists of the diodes D1 and D2, one diode D2 being connected to a constant threshold voltage U$t$1. The gate circuit G1 then emits an output signal which consists of the input signal to the gate which has the greatest level. The output of the gate circuit G1 is connected to a first attenuation circuit DF1 as well as to a second attenuation circuit DF2. The attenuation circuit DF2 is connected to a diode D4 included in a second gate circuit G2 which, besides the diode D4 consists of the diode D5. Across the output of the gate circuit the desired reference voltage Uref for the signal comparators SC1-SC6 according to FIG. 1 is obtained.

The second signal path of the reference signal circuit contains a signal comparator CF1 one input of which is connected to the input of the circuit and the second input of which is connected to the output of the attenuation circuit DF1. The signal comparator CF1 gives an output signal only when the instantaneous value of the incoming tone signal level is greater than the reference signal level U$r$ from the attenuation circuit DF1, otherwise the output signal from the comparator is zero. The output of the comparator is, via a diode D3, connected to a timing circuit RC. This circuit consists of an RC-link, for example a $\pi$-link containing a resistor in the series path and a capacitor together with still another resistor in each shunt path. The timing circuit RC is connected to a second comparator circuit CF2, one input of which is connected to a constant threshold voltage U$t$2. The output signal of the comparator is high (=U$t$5) if the threshold voltage U$t$2 is greater than the level of its input signal and the output signal is low if the threshold voltage U$t$2 is less than its input signal. The two parallel signal paths of the holding circuit are at the output connected together via the gate circuit 62, whereby the highest of the output signals from the comparator circuit CF2 and the attenuation circuit DF2 is obtained as the output signal. This output signal is designated Uref and corresponds to the reference signal in the known arrangement according to FIG. 1.

The operation of the circuit shown in FIG. 2 will first be described with reference to the timing diagrams shown in FIGS. 3 and 4 and with the assumption that a correct incoming signal appears across the input of the receiver. By correct incoming signal is meant an incoming signal which consists of two determined voice frequencies (a so called beat signal) and that the duration of the signal is greater than a certain value $\tau$. The characteristics of such an incoming signal one shown in FIG. 3$a$ (the incoming signal to the comparator CF1 and to the rectifier RL). The incoming tone signal is full wave rectified in the rectifier RL, a signal with mainly a constant level UL being obtained, c.f. FIG. 3$b$. The incoming signal to the attenuation circuit DF1 consists during a short time interval in the beginning of the tone signal of the threshold voltage U$t$1, since the rectified value of the tone signal in the beginning increases to its stationary level. In FIGS. 3$a$ - $f$ the case is shown when the threshold level U$t$1 is less than the level of the rectified tone but the conditions will be analogous if instead the threshold level U$t$1 is greater than the level of the rectified tone signal.

In the comparator CF1 a comparison of the incoming tone signal with the signal U$r$ obtained from the attenuation circuit DF1 takes place. For each time interval during which the incoming signal is greater than the signal level obtained from the attenuation circuit, a high level from the comparator circuit DF1 is obtained, whereby a series of pulses according to FIG. 3$c$ is obtained. These pulses are supplied to the timing circuit RC, each pulse from the comparator CF1 charging the capacitor included in the timing circuit to a certain value. During the subsequent pulse interval the capacitor discharges only an insignificant amount so that an output signal from the circuit RC according to FIG. 3$d$ is obtained. This output signal is in the comparator CF2 compared with the threshold level U$t$2. If then the threshold level U$t$2 is greater than the signal obtained from the timing circuit ($t < t$1 in FIG. 3$d$) a signal with high level (=U$t$5) is obtained from the comparator CF2, while a signal with low level (=0) is obtained if the reference level U$t$2 is less than the level of the signal obtained from the timing circuit ($t$1 $< t < t$2 in FIG. 3$d$).

In the attenuation circuit DF2 an attenuation of the output signal from the gate circuit G1 takes place, which signal consists of the incoming tone signal from the rectifier RL if the level UL of the tone signal is greater than the threshold level U$t$1. The gate circuit G2 gives as an output signal, that signal which is the greater of the rectified tone signal and the signal which is obtained from the comparator circuit DF2. The attenuation is the attenuating circuit DF2 and the output level U$t$5 of the comparator CF2 are suitably chosen so that level U$t$5 always is greater than the level of the output signal from the attenuating circuit DF2, c.f. FIG. 3$f$ which shows the reference voltage Uref.

During a correct incoming tone signal, the signal obtained from the timing circuit RC will successively increase as it appears from FIG. 3$d$, so that, at the time $t$1, the comparator CF2 changes its state and a low level is obtained therefrom. This level is chosen lower than the output level from the attenuating circuit DF2, for which reason the reference voltage Uref now will be equal to the level of that from the attenuating circuit DF2. In FIG. 4 the process of the reference voltage Uref is closely illustrated and as comparison, the output signal U1 from the rectifier RL1 according to FIG. 1. The reference voltage Uref assumes from the beginning a high value (=U$t$5), c.f. FIG. 3$f$, and, after the time $t$1, a low value, so that the signal U1 is greater than the reference voltage Uref. This implies that the signal comparator SC1 changes its state and that the output $s$1 is activated. Thus, one tone in the incoming tone signal has been detected. In a similar manner the second tone, for example U2 is detected.

It is now assumed that a disturbing signal of the same character, i.e. the same frequency as the correct signal but with short duration appears across the input I of the receiver, c.f. FIG. 5$a$. For example, it is assumed that the duration of the disturbing signal is only half a period of the beat frequency of the correct signal, c.f. FIG. 3$a$. Then the output signal from the timing circuit RC will never reach the threshold level U$t$2, c.f. FIG. 3$c$ and the circuit constantly gives a high output level, i.e. the reference voltage Uref is constantly high. This case is indicated by the dotted lines in the FIGS. 3$d$, $e$ and $f$. The signal obtained from a bandpass filter, for example, the filter BP1 and from the rectifier RL1 has too low level in relation to the level of the reference signal Uref, c.f. FIG. 5$b$. Due to the fact that the level of the reference voltage thus constantly is too high, none of the signal comparators SC1-SC$n$ changes its state and the outputs $s$1-$sn$ remain non-activated. Thus, by the proposed circuit one has obtained disturbance protection for disturbing signals having a certain short duration.

From, for example, FIG. 3d it is understood that the time $t1$ for the change of state of the comparator CF2 essentially depends on the magnitude of the threshold value $Ut2$. For a certain time constant of the timing circuit RC, the level $Ut2$ should be chosen so that it will not be situated too close to the peak value of the output signal from the timing circuit during the first half period of the beat frequency (point F1 in FIG. 3d) and, neither too close to the corresponding value during the next half period (point F2). The maximum value of the duration of transient disturbing signal determines which value of the levels $Ut2$ within the interval between the values F1 and F2 should be chosen.

We claim:

1. A reference signal circuit in a MFC-signalling receiver for the detection of two voice frequencies in a tone signal independent of short duration disturbing signals, the receiver including a number of parallel signal paths equal to the number of possible voice frequencies in the incoming tone signal, each signal path consisting of a bandpass filter, a rectifier device and an analogue signal comparator for comparison of the signal obtained from the rectifier device with a reference signal, said reference signal circuit comprising: input means for receiving the incoming tone signal; a first signal path, said first signal path including a full wave rectifier means having an input connected to said input means and an output, a first source of a first threshold voltage, a first gating means having a first input connected to the output of said full wave rectifier means, a second input connected to said first source and an output for producing a first intermediate reference signal in dependence on the amplitude of the incoming tone signal; a second signal path, said second signal path having a timing comparator means having a first input connected to said input means, a second input connected to the output of said first gating means and an output for generating a second intermediate reference signal in dependence on the duration of the incoming tone signal and the amplitude of the first intermediate reference signal, a second source of a second threshold voltage, an amplitude comparator means having a first input connected to said second source, a second input connected to the output of said timing comparator means and an output for emitting a signal which switches from a high level which is greater than the greatest level of the incoming signal to low level when the level of the signal from said timing comparator means exceeds the level of the second intermediate reference signal; and second gating means having a first input connected to the output of said amplitude comparator means, a second input connected to the output of said first gating means and an output for emitting an output reference signal having a level which is related to the level of the higher level signal received at its inputs.

2. The reference signal circuit of claim 1 wherein said timing comparator means comprises another amplitude comparator and an RC timing circuit connected in series.

3. The reference signal circuit of claim 1 further comprising a first attenuation means connected from the output of said first gating means and the second input of said timing comparator means for producing a reference level which is less than the maximum level of the incoming tone signal.

4. The reference signal circuit of claim 3 further comprising a second attenuation means connected from the output of said first gating means to the second input of said second gating means, the attenuation of said second attenuation means being chosen with respect to the signal level which is obtained from said rectifier device in the receiver when receiving a normal incoming tone signal.

* * * * *